United States Patent [19]

Baptiste, Sr.

[11] 4,258,819
[45] Mar. 31, 1981

[54] VEHICULAR BRAKE SYSTEM

[76] Inventor: Maurice Baptiste, Sr., 129 County Rd., East Freetown, Mass. 02717

[21] Appl. No.: 1,977

[22] Filed: Jan. 8, 1979

Related U.S. Application Data

[63] Continuation-in-part of Ser. No. 861,884, Dec. 19, 1977, abandoned.

[51] Int. Cl.³ .............................................. B60K 27/00
[52] U.S. Cl. ...................................... 180/287; 303/89
[58] Field of Search .............. 180/287, 289, 282, 271; 188/2 R, 110, 265; 303/89; 340/65

[56] References Cited

U.S. PATENT DOCUMENTS

| | | | |
|---|---|---|---|
| 3,559,755 | 2/1971 | Bond | 180/287 |
| 3,669,210 | 6/1972 | Haefner | 180/287 |
| 3,684,049 | 8/1972 | Kimura | 180/282 |
| 3,698,505 | 10/1972 | Webley | 180/287 |
| 3,735,834 | 5/1973 | St. Onge | 180/289 |
| 3,800,279 | 3/1974 | Thompson | 340/65 |
| 3,869,014 | 3/1975 | Federspiel et al. | 188/2 R |
| 3,871,475 | 3/1975 | Stevenson et al. | 180/287 |
| 3,937,295 | 3/1974 | Wright | 180/271 |

Primary Examiner—David A. Scherbel
Assistant Examiner—Kenneth Noland
Attorney, Agent, or Firm—Hamilton, Brook, Smith & Reynolds

[57] ABSTRACT

When the ignition key of a vehicle is turned to the off position an electric motor drives a pump to pressurize the hydraulic brake system of the automobile and thereby automatically apply the brakes. When the ignition switch is later turned to another position the electric motor again drives the pump to release the pressure in the brake lines. Pressure sensitive switches close check valves and turn the pump motor off once the brake system has been engaged or disengaged.

5 Claims, 2 Drawing Figures

VEHICULAR BRAKE SYSTEM

This is a continuation-in-part of application Ser. No. 861,884 filed Dec. 19, 1977 now abandoned.

BACKGROUND OF THE INVENTION

The present invention relates to vehicular brake systems and more particularly to such systems operated by hydraulic fluid.

Most automobiles include an hydraulic brake system for applying brake power to each wheel of the vehicle when a pedal is pressed. In addition, an emergency/parking brake system having a mechanical linkage to only two of the wheels is also provided. The conventional mechanical linkage system has several disadvantages. It must be manually set after the vehicle has been brought to a stop. As a result, it is often neglected and drivers rely on the transmission to prevent the vehicle from rolling. The transmission does not provide secure braking power and is generally only applied to two wheels. Also, unattended children often shift the transmission into the neutral position. Even when the emergency brake has been set, it may be released by a child or by an automobile thief who has "hot wired" the engine to bypass the ignition switch. And even if the emergency brake were controlled by the ignition key as suggested by Wright in U.S. Pat. No. 3,937,295, the mechanical linkage, usually wires, could be easily severed by the thief to release the brakes. The emergency brakes are independent of the hydraulic brakes of the vehicle, and malfunctioning emergency brakes do not affect operation of the vehicle.

The primary object of this invention is to provide a vehicle emergency/parking brake which does not suffer from the above disadvantages of conventional brakes. The brake disclosed is automatically set when the ignition switch is turned to the off position and the brake cannot be readily removed without affecting operation of the vehicle. Further, the parking brake is applied to all four wheels to prevent towing of the vehicle and to provide more braking power. The additional braking power is often needed when a vehicle is parked on a hill or when the parked vehicle is struck by a moving vehicle.

A further advantage of the present invention is that any fluid which leaks from the conventional hydraulic brake system is replaced with operation of the auxiliary brake system of the present invention.

The auxiliary brake system is an easily connected addition to the conventional hydraulic system.

SUMMARY

An automatic vehicle brake system includes an auxiliary hydraulic pump for pumping hydraulic fluid to the usual hydraulically actuated brakes. The pump is activated in response to movement of the vehicle on/off switch into the off position. Release means are provided to release the hydraulic pressure when the on/off switch is moved to a position other than the off position.

During the pressurizing mode the auxiliary hydraulic pump is deactivated in response to a high pressure level. During the pressure release mode the pump draws pressure from the brakes and is deactivated at a predetermined low pressure level. Check valves are provided to control the fluid flow to and from the auxiliary pump during the pressurizing and pressure release modes.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DESCRIPTION OF PREFERRED EMBODIMENTS

Figure 1:
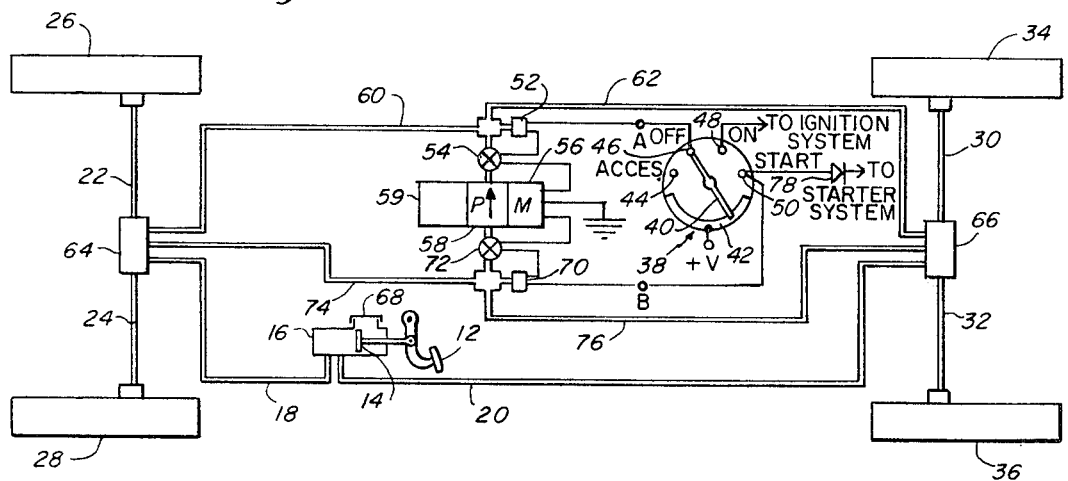
FIG. 1 is an electrical and hydraulic schematic diagram of an auxiliary brake system embodying the present invention.

As shown in FIG. 1, in a conventional hydraulic brake system a foot pedal 12 moves a piston 14 within a master cylinder 16. Movement of the piston 14 increases pressure in the fluid lines 18 and 20. That pressure is transmitted through line 20 to front fluid lines 22 and 24 to actuate the brake cylinders 26 and 28 associated with the front wheels. Similarly, pressure is transmitted through line 20 to rear fluid lines 30 and 32 to actuate brake cylinders 34 and 36 at the rear wheels.

The electrical system of the vehicle is controlled by an ignition or on/off switch 38. In that switch, a key (not shown) is used to move a rotary contact member 40 into any of four positions where it bridges a contact 42 and respective contacts 44, 46, 48 and 50. The contact 42 is connected to the voltage supply battery of the vehicle. In the usual case, the electric circuit is broken when the contact 40 is in the off position at 46. Only accessories are energized when the contact 40 is positioned at 44. The starter and ignition system is energized when the contact is moved to position 50 and then the starter system is bypassed to energize the ignition system when the contact is in position 48.

In accordance with the present invention, when the contact 40 is placed in the off position 46 an electrical circuit is energized from pin A to actuate the hydraulic brakes. Another connection is made from the start position 50 to pin B to release the hydraulic brakes.

When a voltage is first applied to pin A from the stop position of the ignition switch 38, the voltage is applied through a closed switch 52 to open a check valve 54 and energize an electric motor 56. The motor 56 drives a rotary pump 58. The pump takes hydraulic fluid from the reservoir 59 and drives it into front and rear auxiliary brake lines 60 and 62. The fluid pressure is transmitted through junction boxes 64 and 66 to each of the wheel brake cylinders 26, 28, 34 and 36 to apply the brakes.

Switch 52 is a fluid pressure responsive switch which opens when the pressure in lines 60 and 62 reaches a predetermined high level sufficient to actuate the brakes. When that pressure level is reached and switch 52 is opened, the valve 54 is closed and motor 56 is turned off. The pressure level to which switch 52 responds is determined by the particular vehicle brake system.

It should be noted that the fluid pressure is also transmitted through lines 18 and 20 to the master cylinder 16. It is therefore necessary that the cap 68 provide a seal which holds tight with the pressure applied from the auxiliary pump 58. Because of this fluid connection between the auxiliary pump 58 and the master cylinder 16, any incidental losses of fluid in the primary brake system are replaced from the reservoir 59 with application of the brakes through pump 58.

When the ignition switch 38 is later moved to the start position 50 to start the engine, a signal is applied through switch 70 to open a check valve 72 and energize the motor 56. With the valve 54 closed, fluid is drawn from lines 74 and 76 into the reservoir 59 to release the pressure in the hydraulic system. The pump 58 cannot draw a vacuum and the hydraulic lines are air tight. Thus, although pressure is released from the hydraulic fluid lines and the wheel cylinder fluid volumes are reduced, the lines are at all times filled with fluid. In any case, the motor 56 is turned off when the pressure responsive switch 70 senses a predetermined low pressure level. When switch 70 opens, valve 72 closes and pump 58 turns off. With the pressure thus released, the hydraulic brake system can be operated in the usual manner with pedal 12.

Figure 2:
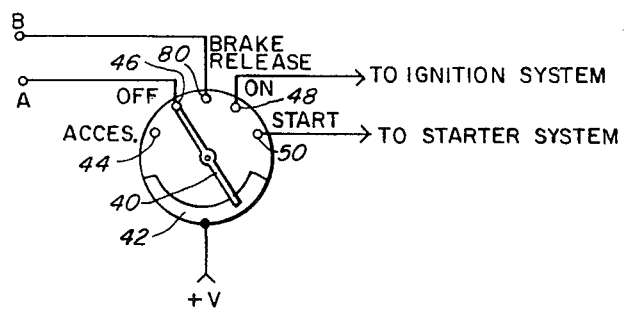
FIG. 2 shows an ignition switch which may be used as an alternative to the switch shown in FIG. 1.

In order that the brakes not be released when the vehicle is "hot wired", it is necessary that a signal not be received at pin B when a direct connection is made from the battery to the starter system. To that end, a diode 78 may be provided at the ignition switch. Alternatively, the ignition switch shown in FIG. 2 may be used. In that switch an additional brake release contact 80 is provided somewhere between the off contact 46 and the start contact 50. To release the auxiliary brake system, the rotary contact member 40 must be held at contact 80 for an instant to energize the brake release mechanism. The brake release mechanism is then completely independent of the starter and ignition systems and will not be affected by tampering with those systems as a thief.

The motor 56, pump 58, reservoir 59, and check valves 54 and 72 are supplied as a single unit under the trademark Delco. That unit has been used to power convertible automobile roofs.

To connect the above-described system into a conventional hydraulic brake system, one need only modify or replace the ignition switch and connect the Delco unit and pressure sensitive switches into the fluid lines. Thus, the auxiliary system is easily added to a conventional system.

While the invention has been particularly shown and described with reference to preferred embodiments thereof, it will be understood by those skilled in the art that various changes in form and details may be made therein without departing from the spirit and scope of the invention as defined by the appended claims.

What is claimed is:

1. An automatic vehicle brake system for a vehicle having a key actuated on/off switch for controlling the vehicle engine and having hydraulically actuated brakes, the system comprising:

an auxiliary hydraulic pump for pumping hydraulic fluid to the hydraulically actuated brakes;

activating means responsive to the on/off switch on the off position for activating the auxiliary hydraulic pump to apply hydraulic pressure to the brakes; and release means responsive to the on/off switch in a position other than the off position to activate the auxiliary hydraulic pump to withdraw pressure from the brakes, the hydraulic pump being deactivated after withdrawing the hydraulic pressure from the brakes in response to a low pressure level.

2. An automatic vehicle brakes system for a vehicle having a key actuated on/off switch for controlling the vehicle engine and having hydraulically actuated brakes, the system comprising:

an auxiliary hydraulic pump for pumping hydraulic fluid to the hydraulically actuated brakes;

activating means responsive to the on/off switch on the off position for activating the auxiliary hydraulic pump to apply hydraulic pressure to the brakes;

a first valve which is opened to the brakes when the auxiliary hydraulic pump is activated in the pressurizing mode;

release means responsive to the on/off switch in a position other than the off position to activate the auxiliary hydraulic pump to withdraw pressure from the brakes; and a second valve which is opened from the brakes when the auxiliary hydraulic pump is activated in the pressure release mode.

3. An automatic vehicle brake system as claimed in claim 2 wherein each of the valves is closed in response to hydraulic fluid pressure.

4. A vehicle brake system for a vehicle having hydraulically actuated brakes, the system comprising:

an auxiliary hydraulic brake for pumping hydraulic fluid to the hydraulically actuated brakes;

activating means for activating the auxiliary hydraulic pump to apply hydraulic pressure to the brakes;

high pressure responsive means for deactivating the auxiliary hydraulic pump once the hydraulic pressure has reached a predetermined high level; and release means for activating the auxiliary hydraulic pump to withdraw hydraulic pressure from the brakes, the auxiliary hydraulic pump being deactivated by low pressure responsive means when the hydraulic pressure has dropped to a predetermined low level.

5. A vehicle brake system as claimed in claim 14 further comprising:

a first valve which is opened to the brakes when the auxiliary hydraulic pump is activated in the pressurizing mode; and a second valve which is opened from the brakes when the auxiliary hydraulic pump is activated in the pressure release mode.

* * * * *